Patented Aug. 14, 1928.

1,680,943

UNITED STATES PATENT OFFICE.

IVAN S. HOCKER, OF PHILADELPHIA, PENNSYLVANIA, ASSIGNOR TO THE HOCKER CORPORATION, OF PHILADELPHIA, PENNSYLVANIA, A CORPORATION OF DELAWARE.

PROCESS OF EXTRACTING FATS FROM VEGETABLE MATTER.

No Drawing.　　Application filed January 26, 1924.　Serial No. 688,872.

My invention consists of a certain novel process of extracting fats from vegetable matter whereby a more complete extraction of the fats is possible, and at a cost far below that which has been practicable heretofore.

My invention relates more particularly to a process of extraction, wherein the fats are separated by the action of some ferment, without the aid of solvents or mechanical means, and my specific application is to the fats contained in the cacao bean; the seed of the cacao plant, although with the proper modification my process may be applied to other materials of vegetable origin such as cotton seed, flax seed and the like.

The two general processes employed heretofore for the extraction of fats from vegetable matter, particularly the seeds of plants have been: (1) the mechanical expressing of the fats by means of suitable apparatus, and (2) the dissolving out of the fats by means of some volatile solvent and the subsequent evaporation of the solvent. The process of expressing gives very incomplete results, while the solvent process in addition to being very costly of operation, is not entirely suitable when applied to edible fats and oils, since most solvents leave an undesirable taste or odor. Thus while my invention is applicable broadly to any vegetable matter, its particular utility lies in the extraction of the edible fats from the seeds of plants, such as cacao beans.

The cacao bean, similar to most other plant seeds, consists of closed fibrous cells of a cellulose material; containing within them fat, albumen, starch and water; besides a quantity of theobromine and cacao pigment and small quantities of sugars and salts. While my process relates chiefly to the extraction of the fat, which constitutes about 50% of the shelled cacao beans; the starch (10%) and albumen (15%) have an important bearing on my process.

It is well known that starches have a great affinity for fats and oils, due to the fine state of division of the starch and the surface tension of the fats and oils; and evidenced by the difficulty encountered in the mechanical separation of mixtures of starches and fats. This affinity of starches for fats accounts for the incomplete results of all processes of expressing fats from plant seeds. The difficulty of mechanical separation is further aggravated in the case of the cacao bean, by the fact that the starch of the cacao bean consists of the most minute granules of any starch, thereby intensifying its affinity for oils and fat.

In view of this intense affinity of starch for fats, my process consists of two distinct steps; namely, the decomposition of the starch into aqua soluble products, thus liberating fat in partially emulsified form, and the subsequent dimulsification of the fat emulsion and its separation of the liberated fat from the aqueous mixture. The first step I accomplish by a gelatinization and subsequent hydrolyzation of the starch; while the second step is brought about by the fermentation of the hydrolyzation products of the starch as well as of the albumen and sugars originally contained in the cacao bean.

For the purpose of illustrating my invention, I have shown embodiments thereof which are at present preferred by me, since they will be found in practice to give satisfactory and reliable results. It is, however, to be understood that the various instrumentalities of which my invention consists can be variously arranged and organized and that my invention is not limited to the precise arrangement and organization of these instrumentalities as herein described.

In carrying out my invention I may start with either the natural cacao bean, the cacao bean of commerce, or any cacao product thereof, such as cacao nibs, though for practical purposes I prefer to use the commercial cacao bean or cacao powder, which bean is the natural bean after it has been cured and roasted.

Preparatory to my process I reduce the cacao bean to a paste of a fine state of division, by means of grinding; so that it may be acted upon more readily and uniformly by the several agencies of my process. This finely divided cacao bean I mix with a suitable quantity of water, approximately one gallon of water to the pound of the ground cacao bean, and maintain the mixture in a suitable container at a temperature of from 75° to 120° C. for a period of approximately fifteen minutes to one hour. During this operation all the water soluble parts of the bean such as the sugars and albumenoids are brought into solution, while the insoluble starch is gelatinized by the action of the heat and water; making it more easily decomposable during the subsequent steps of the process.

I next cool this mixture to about 50 to 80 degrees C. and add a suitable quantity of a hydrolytic, or diastatic material, which will hydrolyze the starch without affecting the fatty constituents, such as malt extract, of which a suitable proportion is:— one ounce of the malt extract to one gallon of the aqueous mixture. The mixture is then maintained at the approximate temperature of 65 degrees C. a sufficient length of time to completely hydrolyze or saccharify the sugar; maltose. During this period of ½ hour to 2 hours more or less, depending upon the percentage of starch, which varies with the different varieties of cacao beans; there ensues a liberation and a simultaneous emulsification of the fat. Thus this hydrolysis or saccharification of the starch leaves the fat dispersed throughout the mixture in an emulsified condition.

This mixture I then cool to a temperature below the thermal death point of the fermenting agent for the sugars and albumens present, which may be a bacterial ferment or yeast. In the case of yeast, which is preferred by me, this temperature is about 50 degrees C. The amount of yeast necessary is dependent upon the rapidity of fermentation desired, and the quantities of fermentable material and cultural material such as soluble albumenoids and mineral matter present in the mixture. For the present case, I have found, that a quantity of yeast represented by one per cent of the mixture will complete the fermentation of the mixture to the point desired within approximately 24 hours.

The action of the yeast is twofold:—it ferments the maltose produced by the hydrolysis of the starch as well as the other sugars originally present in the cacao bean; to alcohol chiefly $C_2H_5OH$ and carbon dioxide $CO_2$; the albumen on the other hand is broken down to amines and amides. The carbon dioxide or other gases produced by the fermentation coagulate the emulsified fat into minute globules which are then carried to the surface by the gas as it rises through the mixture. Upon the completion of the fermentation the mixture is allowed to cool, whereupon the fat collected on the surface solidifies, and may then be easily removed. The fat may thereafter be purified by any of the well known methods.

Having thus described my invention what I claim as new and desire to secure by Letters Patent, is:—

1. The process of extracting fat from products of cacao beans which consists in reducing said products to a fine state of division; mixing the same with water in proportion of about one gallon to one pound of cacao bean product; heating the mixture at a temperature of from 75 to 120 degrees C. for a period of from fifteen minutes to one hour; subjecting the mixture to the action of a starch hydrolytic agent for a period of one-half to two hours and at a temperature of from 50 to 80 degrees C., subjecting the mixture to fermentation at a temperature below the thermal death point of the ferment, and for a period of time sufficient to completely liberate the fat contained in said mixture, and lastly separating the fats from the resultant mixture.

2. The process of extracting fat from cacao beans which consists in finely dividing the cacao beans, mixing with water and heating to bring water soluble constituents into solution and gelatinize the starch therein, then treating the mixture at a suitable temperature with a diastatic ferment to saccharify the starch and to liberate the fat, thereafter adding an alcoholic fermenting agent after reducing the temperature of the mixture below the thermal death point of such fermenting agent, whereby gases are formed which cause coalescence of the fat globules in the emulsion and carry them to the surface of the mixture, and subsequently removing the fat therefrom.

IVAN S. HOCKER.